May 25, 1943.   C. W. TELANDER   2,319,891
CALCULATING APPARATUS
Filed Feb. 24, 1940
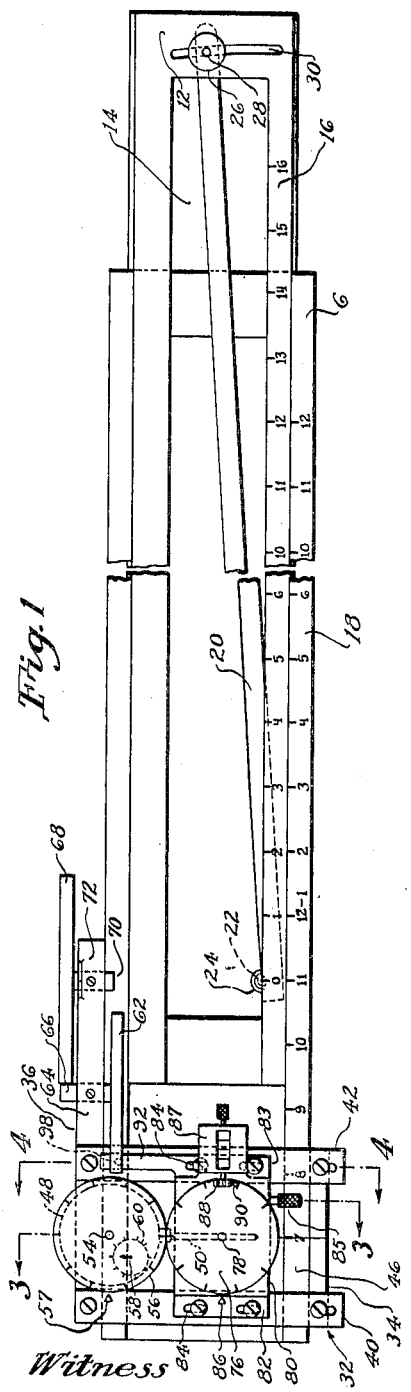

Patented May 25, 1943

2,319,891

UNITED STATES PATENT OFFICE 2,319,891

CALCULATING APPARATUS

Carl W. Telander, Randolph, Mass.

Application February 24, 1940, Serial No. 320,631

1 Claim. (Cl. 235—61)

The present invention relates to calculating apparatus and particularly to apparatus which, although useful for general purpose calculation, are particularly suitable for computation of pay rolls, cost accounting data, and the like.

The principal object of the invention is to provide a device for rapid computation of quantities involving multiplying factors, and also to accumulate a succession of such multiplied values whenever desired.

With this and other objects in view as will hereinafter appear, the principal feature of the invention comprises a calculating device of the general slide rule type and provided with an adjustable ratio means, together with an indicator co-operating therewith. In the preferred form of the invention which is herein described as a pay-roll calculator, the ratio means comprises an adjustable bar which may be set to correspond with any desired rate per hour. The number of hours as shown by the usual time cards are set on the slides of the instrument and the indicator is moved along the rate bar. Provision is made for accumulating the daily totals in order to give the total pay roll for any worker over a weekly or any longer period. The device may be applied to other computations in a manner which will become apparent from the description of the preferred embodiment of the invention.

In the accompanying drawing Fig. 1 is a plan view of the preferred calculating device according to the present invention; Fig. 2 is a front elevation; and Figs. 3 and 4 are enlarged detail sectional views on lines 3—3 and 4—4 of Fig. 1.

The device shown in the drawings comprises a base indicated generally at 6, and grooved longitudinally as shown at 8, to accommodate a slide 12. The slide is in the form of a hollow rectangle having a large rectangular opening 14. The front edge of the slide is provided with a scale 16 co-operating with a similar scale 18 on the front upper surface of the body 6. As shown in Fig. 1, the scale 18 is marked for pay-roll computation in accordance with the working hours of the day: for example, from 8 to 12 and from 1 to some higher number indicated as 12 on the scale, no interval being provided for the noon hour between 12 and 1. The scale 16 on the slide is a regular arithmetic scale running from zero to 16. With the slide set as shown in Fig. 1, the instrument immediately indicates by way of an example that a workman starting at 11 o'clock and working until 5 o'clock has worked five hours. The intervals between numerals on the scales may be subdivided as finely as desired. The lower scale 18 on the base 6 will be marked in accordance with the working hours in the particular plant in which the instrument is to be used.

Pivoted below the scale 16 on the slide is a ratio device or rate bar 20. The pivot 22 therefor is disposed in correct relation directly above the zero point on the scale, and to afford proper register with the indicating instrument presently to be described, the pivotal connection is established through a boss 24 protruding into a hollow central portion 14 above the rate bar. The rate bar may be set in any desired angular position and is held in place by a thumb nut 26 on a screw 28 which is attached to the end of the rate bar and extends upwardly through a slot 30 in the end of the slide.

Mounted on the base is a carriage indicated generally at 32 and having a gib 34 adapted to slide in a groove in the front wall of the base 6, and a block 36 adjacent to the rear wall of the base. A spring pressed key 38 is received in grooves of the base 6 and block 36, and as shown in Fig. 3 the key is of such dimensions as to permit a slight vertical movement of the block with respect to the base. The gib 34 and the block 36 are connected by struts 40 and 42, the connection thereof to the gib 34 being by means of screw and slot connections 44 whereby the carriage may be accurately adjusted into correct angular position with respect to the base. The carriage is provided with a transparent plate 46 having an index mark to co-operate with the scale 18. Mounted on the carriage is a dial indicator 48 of well-known form having a rack bar 50 provided with a foot 52 to engage the rate bar 20 of the instrument when the carriage is moved to the right. The dial indicator, being of well-known construction, is not shown in detail and it is sufficient to note that movement of the rack bar 50 operates through a rack and pinion to rotate the indicator shaft 54. Mounted on this shaft, instead of the usual hand, is a transparent dial plate 56 provided with suitable graduations, which are read against a stationary pointer 57. In common with instruments of this type the indicator has a hand 58 operated through suitable gearing and this hand is visible through the dial plate 56. The hand 58 is associated with a graduated dial 60 on the body of the indicating instrument. For accounting computations the dial 56 is graduated in cents and the hand 58 is driven through a suitable gear ratio so that the graduations 60 read directly in dollars.

From the description thus far it will be seen that a simple pay-roll computation may be made, assuming the rate bar 20 to be set at the proper angle, by setting the zero point of the slide scale 16 above the time at which the employee started work, and then moving the carriage until the index mark on the plate 46 is directly above the time at which the employee stopped work for the day. As the carriage is moved the foot 52 first engages the rate bar at the zero point and then further movement of the carriage causes the rack 50 to ride on the rate bar, thereby operating the indicator to read the proper figure in dollars and cents. The initial setting of the rate bar is most accurately accomplished by a standard preliminary calculation; with the slide in a definite relation to the body the carriage is moved to a predetermined point on the scale and the rate bar is then adjusted until the indicator reads the proper value.

The construction shown in the drawing also provides means for accumulating readings of both time and the product of rate and time. The time accumulator comprises a wheel 62 accurately journaled in a standard 64, the periphery of the wheel being adapted to roll without slippage on the upper rear surface of the body 6. The wheel has a shaft 66 which drives an indicator wheel 68 by frictional engagement, the latter wheel being mounted on a shaft 70 journaled in a standard 72. The indicator wheel is graduated on its front face and a suitable index 74 is mounted on the standard 72.

Accumulation of the product of rate and time is accomplished by a dial 76 mounted on a shaft 78 which is journaled in a plate 80 slidingly mounted on the struts 40 and 42. As shown in Figs. 1 and 2, the plate 80 forms a bridge over the rack bar 50 of the indicating instrument and is provided at its edges with flanges 82 and 83 overlying the struts 40 and 42 and connected to the struts by screw and slot connections 84 which permit some sliding movement of the plate with respect to the struts. When the plate 80 is in its rearward position as shown in Figs. 1, 3 and 4, the accumulator dial 76 is in frictional engagement with the indicator dial plate 56 and is rotated thereby. When the plate 80 is pulled forward, for which purpose a finger grip 85 is provided, the dials are disengaged and the amounts accumulated on the dial 76 are allowed to remain regardless of any subsequent motions of the indicator dial 56. The dial 76 is graduated in cents which are read against a pointer 86. Dollar accumulations are indicated by a revolution counter 87 mounted on an extension of the plate 80 and having a starwheel 88 operated by a pin 90 near the periphery of the accumulator dial 76, so that each complete revolution of the dial 76 advances the counter 87 by one digit.

Movement of the plate 80 to its forward or non-accumulating position is also effective to prevent accumulation of time on the wheel 68. To this end the flange 83 is provided with a rearward extension 92 having a recess 94 in its rear under surface, the rear wall of the recess being inclined as shown at 96. A pin 98 loosely received in a hole in the strut 42 bears on the upper surface of the body 6 and has its upper end received in the recess 94. Upon pulling the plate 80 forwardly, the inclined surface 96 rides up on the pin 98 and slightly lifts the whole carriage assembly with it. Since some freedom is provided by the key 38 in the keyways of the block 36 and the body 6, the wheel 62 is lifted out of engagement with the upper surface of the body, thereby preventing rotation of the wheel upon movement of the slide.

To illustrate the operation of the device a simple pay-roll calculation may be taken as an example. Assume that a workman paid at the rate of 80 cents an hour works varying hours for the several days of the week, on the first day between eleven a. m. and five p. m. except for the standard one-hour lunch period. The rate bar 20 is set for the 80-cent rate, preferably by means of a preliminary setting as heretofore described. The slide is then set with its zero opposite the numeral 11 on the scale 18. All dials are now set to zero. The index on the transparent plate 46 is then set over the zero of the slide, care being taken during this setting to pull the grip 85 forward so that the wheels 66 and 68 will not be rotated. When the setting is accomplished, the grip is released and the carriage is moved to the right until the index is above the numeral 5 on the scale 18, this being the hour at which the employee stopped work for the day. At the end of this motion the total number of hours, namely 5, will be indicated by the wheel 68 and the total amount, namely $4., will be indicated by the dial 56 and the hand 58 as well as by the accumulator dial 76 and revolution counter 87. The carriage is now carried back to its original position with the hand grip pulled forwardly so that the accumulated figures will not be disturbed. In this return movement the dial 56 and the hand 58 return automatically to zero. For the next day let it be assumed that the employee works from eight a. m. to four p. m., again with the standard lunch period. The zero on the slide is then set to register with the numeral 8 on the scale 18, the carriage is reset so that its index is again above the zero of the slide (this resetting being likewise accomplished with the grip 85 pulled forward so that the previous accumulations will not be disturbed), and then the carriage is slid along to the numeral 4 on the scale 18. At the end of this movement the hand 58 and the dial 56 will indicate $5.60 which is the total wages for the second day, the counter 86 and the dial 76 will register $9.60 which is the accumulated wages for two days, and the wheel 68 will register the total of twelve hours accumulated time for the two days. These operations may be repeated for successive days and the totals of both time and wages will be properly indicated. If the rate changes during the interval for which the computation is made, this may be taken care of by a proper setting of the rate bar. If the rate bar setting is carried out by a standard preliminary computation, care should be taken to release the accumulator indicators by means of the grip 85 so that previous accumulations may not be disturbed.

Although the invention has been described as applied to pay-roll computations, it may be applied equally to cost accounting problems, inventory computations, or, in fact, to any multiplying calculation. In general, any given number of units (e. g. hours) may be multiplied by any other number determined by the setting of the rate bar 20 and the extensions thus obtained may be automatically added or accumulated on the counter 87 and dial 76.

Having thus described the invention, what is claimed is:

A calculating apparatus comprising a body having a scale divided in suitable units, a slide movable in the body, a ratio bar angularly adjustable in the slide, a carriage movable along the body, a units accumulator on the carriage including a wheel frictionally engageable with the body, a product indicator on the carriage operated by engagement with the ratio bar and having a dial, a product accumulator having a dial frictionally engageable with the product indicator dial, a sliding mounting on the carriage for the product accumulator to permit manual disengagement of the dials, and means including a member connected with said sliding mounting to lift the carriage and to move the wheel of the units accumulator from engagement with the body when the product accumulator is disengaged from the product indicator.

CARL W. TELANDER.